UNITED STATES PATENT OFFICE.

OTTO SIEPERMANN, OF EAST ORANGE, NEW JERSEY, ASSIGNOR TO CONSOLIDATED COLOR & CHEMICAL CO., OF NEWARK, NEW JERSEY, A CORPORATION OF NEW JERSEY.

MANUFACTURE OF COLORING-MATTERS.

1,073,784.  Specification of Letters Patent.  Patented Sept. 23, 1913.

No Drawing.  Application filed October 18, 1912.  Serial No. 726,494.

*To all whom it may concern:*

Be it known that I, OTTO SIEPERMANN, doctor of philosophy, a citizen of the United States, residing at East Orange, county of Essex, State of New Jersey, have invented new and useful Improvements in the Manufacture of Coloring-Matters, of which the following is a full, clear, and exact description.

My invention consists in the manufacture of coloring matters from two molecules of beta-naphthylamin-mono-sulfonic acid and one molecule of beta-naphthol, which coloring matters possess the valuable property of being converted into new and novel lakes of great value.

My new lake-forming coloring matter is preferably produced as follows:—25 grams of the mono-sulfonic acid of beta-naphthylamin—(2:1) (89%) are dissolved in an aqueous solution of 6.4 grams sodium carbonate. This solution is filtered to remove any insoluble impurities, diluted to about 400 c. c. with water and a solution of 7.2 grams sodium nitrite (96%) dissolved in about 5 c. c. of water are slowly added with constant stirring. 50 grams muriatic acid 20 degrees Bé. are diluted with 50 c. c. water and cooled with ice to a temperature of from 0 degrees cent. to 5 degrees cent. The above-cooled solution of beta-naphthylamin-mono-sulfonic acid, sodium carbonate and sodium nitrite is then allowed to run slowly into the cooled solution of muriatic acid with constant stirring in order to form the diazo body.

25 grams of beta-naphthylamin-mono-sulfonic acid (2:1) (89%) are dissolved as above in an aqueous solution of 6.4 grams of sodium carbonate acid diluted to about 800 c. c. and cooled. This solution is run slowly into the above mentioned diazo body, after the latter has been stirred for about thirty minutes, care being taken that the temperature does not rise above 16 degrees cent. This mixture is then stirred until the amido-azo body is thoroughly formed, which is usually effected in about three-quarters of an hour. The thus formed amido-azo compound is then cooled at 5 degrees cent. to 10 degrees cent. and a solution of 7.2 grams sodium nitrite (96%) is added and the mixture stirred until the diazo compound is thoroughly formed. This usually requires about three hours. This diazotized amido-azo compound is of a light chocolate brown color and almost insoluble in water.

23 grams of beta-naphthol, 21 grams caustic soda (36 degrees Bé.) and 7 grams sodium carbonate are dissolved in water, preferably but not necessarily with 15 grams para soap, resin soap, or Turkey red oil, and the whole diluted to 2000 c. c. When this solution is cool the above mentioned diazotized amido-azo compound is run into it slowly with constant stirring. When the reaction between the beta-naphthol and the diazotized amido-azo body is thoroughly completed, the color is filtered off, and pressed into the required consistency for the formation of lake colors. The resulting coloring matter is in the form of a bright scarlet paste, which when dried is a bright scarlet powder insoluble in water, but which dissolves in concentrated sulfuric acid with a dark crimson color, having a very blue undertone, the colors not changing upon standing for fifteen hours. Upon reduction the color yields amido-naphthalene-mono-sulfonic acid, diamido-naphthalene-mono-sulfonic acid and amido-naphthol, and which most probably has the following formula:

$C_{10}H_6.SO_3Na.N=N.C_{10}H_6.SO_3Na.N=N.C_{10}H_6.OH.$

This color possesses the important property of forming very valuable lakes with metallic salts and the alkaline earths. The lakes from some of these salts and earths are of a bright red shade, with a decided blue undertone, are insoluble in water and varnish oils, and are extremely fast to light and lime.

Having thus described my invention what I claim is—

1. The process of producing coloring matters which consists in combining one molecule of diazotized beta-naphthylamin-mono-sulfonic acid (2:1) with another molecule of beta-naphthylamin-mono-sulfonic acid (2:1) diazotizing the resulting product and combining it with one molecule of beta naphthol.

2. The coloring matter which can be obtained from two molecules of beta-naphthyl-amin-mono-sulfonic acid (2:1) and one molecule of beta-naphthol, which color is of a red shade, insoluble in water, soluble in concentrated sulfuric acid with a dark crimson shade having a blue undertone, and which forms lake colors of a red shade possessing great fastness to light and lime.

3. The coloring matter having most probably the formula $$C_{10}H_6.SO_3Na.N=N.C_{10}H_5.SO_3Na.N=N.C_{10}H_6.OH$$

which is in the form of a bright red paste, drying to a bright red powder which is insoluble in water and soluble in concentrated sulfonic acid with a dark crimson shade having a blue undertone, and which is capable of forming bright red lakes possessing great fastness to light.

In witness whereof I have hereunto set my hand in the presence of two subscribing witnesses.

OTTO SIEPERMANN.

Witnesses:
CHAS. LYON RUSSELL,
WM. C. DUNN.